(12) United States Patent
Sachweh et al.

(10) Patent No.: US 8,512,665 B2
(45) Date of Patent: Aug. 20, 2013

(54) PROCESS FOR THE PRODUCTION OF NANOPARTICLES USING MINIEMULSIONS

(75) Inventors: Bernd Sachweh, Meckenheim (DE);
Sonja Judat, Ludwigshafen (DE);
Thomas Danner, Weinheim (DE);
Robert Engel, Speyer (DE); Caroline Mages-Sauter, Weinheim (DE); Heike Schuchmann, Stutensee (DE); Marion Gedrat, Karlsruhe (DE)

(73) Assignee: BASF SE (DE)

( * ) Notice: Subject to any disclaimer, the term of this patent is extended or adjusted under 35 U.S.C. 154(b) by 0 days.

(21) Appl. No.: 13/319,810

(22) PCT Filed: May 10, 2010

(86) PCT No.: PCT/EP2010/056343
§ 371 (c)(1),
(2), (4) Date: Nov. 10, 2011

(87) PCT Pub. No.: WO2010/133465
PCT Pub. Date: Nov. 25, 2010

(65) Prior Publication Data
US 2012/0063992 A1 Mar. 15, 2012

(30) Foreign Application Priority Data
May 18, 2009 (EP) .................................... 09160488

(51) Int. Cl.
*C01F 1/00* (2006.01)
*C01G 1/00* (2006.01)

(52) U.S. Cl.
USPC ........... 423/335; 423/554; 423/610; 423/618; 423/622; 977/773; 977/896

(58) Field of Classification Search
USPC ......... 423/554, 622, 610, 618, 335; 977/773, 977/896
See application file for complete search history.

(56) References Cited

U.S. PATENT DOCUMENTS

| 5,147,412 A | 9/1992 | Klinksiek et al. |
| 6,103,786 A | 8/2000 | Hoch et al. |

| 2010/0080898 A1 | 4/2010 | Danner et al. |
| 2010/0324211 A1 | 12/2010 | Huether et al. |
| 2012/0063992 A1* | 3/2012 | Sachweh et al. ............. 423/554 |

FOREIGN PATENT DOCUMENTS

| DE | 198 56 604 A1 | 6/2000 |
| DE | 10 2007 014916 A1 | 10/2008 |
| EP | 0399266 A2 | 11/1990 |
| EP | 0863173 A2 | 9/1998 |
| EP | 1008380 A2 | 6/2000 |
| WO | WO-2008/058958 A2 | 5/2008 |

OTHER PUBLICATIONS

Dendy Adityawarman et al., "Precipitation of $BaSO_4$ nanoparticles in a non-ionic microemulsion: Identification of suitable control parameters", Chemical Engineering Science vol. 60, pp. 3373-3381, (2005(.

Freddy A. Aguilar et al., "Herstellen von Emulsionen in Hochdruckhomogenisatoren mit modifizierten Lochblenden", Chemie Ingenleur Technik, vol. 76, No. 4, pp. 396-399, (2004).

Marion Gedrat et al., "Chemical Engineering and Processing: Process Intensification", Chemical Engineering and Processing, vol. 50, pp. 220-225, (2011).

International Preliminary Report on Patentability for PCT/EP2010/056343 mailed Dec. 15, 2011.

Lee, M-H, et al., "Synthesis of Spherical Zirconia by Precipitation Between Two Water/Oil Emulsions", Journal of the European Ceramic Society, vol. 15, (1999), pp. 2593-2603.

Landfaster, Katharina, "The Generation of Nanoparticles in Miniemulsions", Advanced Materials, vol. 13, No. 10, (2001), pp. 765-768.

International Written Opinion for PCT/EP2010/056343 mailed Aug. 30, 2011.

International Search Report for PCT/EP2010/056343 mailed Mar. 16, 2011.

* cited by examiner

*Primary Examiner* — Timothy Vanoy
(74) *Attorney, Agent, or Firm* — Novak Druce Connolly Bove + Quigg LLP (57) ABSTRACT

The present invention relates to a process for the production of nanoparticles or nanostructured particles with the help of a 2-emulsion method, particles being produced through targeted coalescence of miniemulsions in a high-pressure homogenized.

16 Claims, 4 Drawing Sheets

PROCESS FOR THE PRODUCTION OF NANOPARTICLES USING MINIEMULSIONS

CROSS-REFERENCE TO RELATED APPLICATIONS

This application is a national stage application (under 35 U.S.C. §371) of PCT/EP2010/056343, filed May 10, 2010, which claims benefit of European application 09160488.4, filed May 18, 2009.

BACKGROUND OF THE INVENTION

The present invention relates to a process for the production of nanoparticles or nanostructured particles using an emulsion method, particles being produced through targeted coalescence of at least two miniemulsions.

The prior art discloses a large number of production processes and uses of nanoparticles where solid or colloidal particles with a particle diameter of less than 1 µm can be referred to as nanoparticles. Nanoparticles can, for example, be composed of inorganic or polymeric material and in many cases have an average particle size of from 1 to 1000 nm. For the production of inorganic particles, the sol-gel process and microemulsion technology, for example, are known. Polymeric nanoparticles can be produced, for example, by emulsion polymerization. The targeted formation and structuring of nanoparticles is of particular interest for achieving particular properties of the nanoparticles for highly specialized applications.

Emulsions is the term used to refer to finely distributed mixtures of at least two liquids which are not homogeneously miscible with one another. One example is the mixture of oil and water. A liquid forms the so-called inner or disperse phase, which is present distributed in the form of small droplets in the second liquid, the so-called outer or continuous phase. Important constituents of emulsions are surface-active substances, so-called surfactants or emulsifiers, which facilitate the formation of the droplets and counteract demixing (phase separation). A distinction is made between oil-in-water emulsions (O/W emulsion), in which droplets of the nonpolar phase (for example oil droplets) are present in the continuous polar phase (for example water phase), and correspondingly water-in-oil emulsions (W/O emulsion), which are also called inverse emulsions. Emulsions should in most cases remain stable for a certain period and under certain conditions (e.g. temperature, pH range).

In conventional emulsions (macroemulsions), the drop sizes in the disperse phase are nonuniform. The drop sizes in macroemulsions are in most cases between 100 nm and 1 mm. Macroemulsions are thermodynamically unstable and often separate within a relatively short time. The term miniemulsion refers to a thermodynamically unstable emulsion, where the disperse phase is present in very finely distributed droplets with an average droplet diameter of <10 µm, in particular <5 µm. Miniemulsions are obtained, for example, through shearing with a high energy input starting from two (or more) immiscible liquids and one or more surface-active substances (surfactant, emulsifier). The droplets of a miniemulsion can be kept stable under certain conditions over a certain period, meaning that the production of particles in miniemulsions can take place through the melting of various droplets. The required energy input (for example in a shear process) for the production of miniemulsions can take place, for example, through ultrasound treatment or through use of a high-pressure homogenizer. Accordingly, miniemulsions in which a solid, for example in the form of nanoparticles, is present in the disperse phase, are referred to as minisuspoemulsions.

Thermodynamically stable emulsions, which constitute a special case and only exist in particular composition ranges in the water-oil-emulsifier phase system, are referred to as microemulsions. They form spontaneously and are often transparent in appearance. They mostly comprise a high fraction of surfactant and, moreover, in most cases a further surfactant, a cosurfactant. Mixing two microemulsions with different reactants in the disperse phase results in material exchange between the disperse phases and thus in the reaction without the emulsion drops having to be coalesced with the input of energy.

Miniemulsion processes for building up structured nanoparticles, for example with a core/shell structure are described in the prior art. The publication by K. Landfester (Adv. Mater. 2001, 13, No. 10, 17 May, 2001) describes the production of miniemulsions and the use of miniemulsions in the synthesis of nanoparticles and encapsulated nanoparticles. The synthesis of nanoparticles can take place, for example, with the help of miniemulsified molten salts or via the polymerization of a miniemulsified monomer. However, an option for the targeted coalescence of miniemulsion drops is not described here. A disadvantage of the method described here is that in each case one drop is reformed to give one particle, as a result of which the drop size has a clearly limiting influence on the size of the resulting particle.

WO 2008/058958 describes the production of core/shell particles, where an outer layer is applied to solid nanoparticles dispersed in a minisuspoemulsion by, in an emulsion process using an emulsion, converting a precursor substance dissolved in the disperse (preferably aqueous) phase in the disperse phase and thereby applying it to the dispersed nanoparticles.

The production of spherical inorganic nanoparticles through precipitation in a 2-emulsion method using microemulsions is known. Lee et al. (J. European Ceramic Society 19, 1999) describes the synthesis of spherical $ZrO_2$ microparticles where two inverse microemulsions, which comprise precursor substances or reactants in the aqueous disperse phase, are mixed and reacted.

The coalescence, described in the prior art, of miniemulsions, induced by ultrasound treatment or rotor-stator systems (Ultra-Turrax) have the disadvantage that the coalescence of the emulsion droplets cannot be controlled. Moreover, an ultrasound treatment is rather unsuitable for a large-scale application since the ultrasound method is difficult to handle for industrial processes on a relatively large scale. The effect of ultrasound is generally locally limited and often leads to bimodal particle size distributions. The use of microemulsions is limited to narrow special cases and, moreover, has the disadvantage that large amounts of surfactant and cosurfactant contaminate the resulting product.

BRIEF SUMMARY OF THE INVENTION

The invention is directed to a process for the production of nanoparticles which comprises producing in a first step a), at least two miniemulsions and/or minisuspoemulsions, which in each case comprise at least one reactant in the disperse phase and at least one emulsifier, and, in a second step b), the miniemulsions and/or minisuspoemulsions produced in this way are mixed in a high-pressure homogenizer, wherein the disperse phase of the at least two miniemulsions and/or minisuspoemulsions have an average droplet diameter of <10 µm.

It is an object of the invention to provide an easy-to-handle process for the targeted build-up of nanoparticles, and in particular of structured nanoparticles, where drops of a miniemulsion are coalesced in a targeted manner and the coalesced drops are used as reaction space (quasi as nanoreactor).

Surprisingly, it has now been found that miniemulsions and minisuspoemulsions can be produced not only using a high-pressure homogenizer, but that miniemulsions/minisuspoemulsions or mixtures of different miniemulsions/minisuspoemulsions can be coalesced in a targeted manner using a high-pressure homogenizer. The drops of the disperse phase of a miniemulsion can be coalesced in a controlled manner if they are conveyed under high shear through a nozzle, for example a special homogenizing nozzle.

A DETAILED DESCRIPTION OF THE INVENTION

High-pressure homogenizers were originally developed for the homogenization of milk, in which the fat droplets in the milk are reduced to an average drop diameter of from 1 to 2 μm in order, in so doing, to prevent creaming of the milk. High-pressure homogenizers operate according to the pressure release system and essentially consist of a high-pressure pump and a homogenizing valve. High-pressure homogenizers mostly operate in a pressure range from 100 to 1000 bar. The liquid stream which is generated by the high-pressure pump (for example a high-pressure piston pump) flows through the homogenizing nozzle.

The prior art describes various embodiments of homogenizers and homogenizing nozzles, such as, for example, slot nozzles, perforated plates, gap diaphragms, diverting nozzles, countercurrent dispersers. It is also possible to work with combinations of two or more identical or different homogenizing nozzles where a counterpressure is built up.

One possible embodiment of a homogenizing nozzle is the so-called slot nozzle. In the slot nozzle, the liquid stream flows through the valve seat and then radially through the homogenizing gap which is only a few micrometers in width. The homogenizing gap is adjusted by pressing a valve body onto the valve seat. The liquid leaves the homogenizing gap at a very high speed (e.g. about 300 m/s), impacts on the impact ring and leaves the valve via the outlet.

Further common embodiments of homogenizers include e.g. a two-stream nozzle or the combination of, for example, two perforated plates and also the combination of perforated plate with diverting nozzles. As a result of a downstream perforated plate or diverting nozzle, a counterpressure arises, with the help of which it is possible to influence the cavitation results behind the first plate.

In the high-pressure homogenizer, shear forces and expansion forces, impingement flow and, to a decisive extent, also cavitation forces are active. Cavitation refers to the formation and breaking up of cavities in liquids due to pressure fluctuations. Cavitation arises, for example, as a result of objects (e.g. propellers, stirrers) being moved very rapidly in the liquid or as a result of the liquid being moved rapidly, for example, through a nozzle, and also as a result of the effect of ultrasound. The term emulsifying pressure is used to refer to the pressure drop over the homogenizing nozzle.

The present invention describes a process for the production of nanoparticles or nanosuspoemulsions which comprises at least two steps. Hereinbelow, the term "nanoparticles" also refers to nanoparticles which are present or obtained in the form of a nanosuspoemulsion or nanosuspension.

Within the context of the present invention, a process for the production of nanoparticles comprises processes for building up nanoparticles and processes for the nanostructuring of particles, in particular of nanoparticles. A nanostructuring comprises the production of a structure whose dimensions are in the nanometer order of magnitude, such as, for example, the production of core/shell particles or the application of nanoscale regions to a particle surface, in particular a nanoparticle surface. In particular, a process for the production of nanoparticles within the context of the present invention comprises a process for building up nanoparticles, in particular of precursor substances dissolved in a molecularly disperse manner.

The present invention relates to a process for the production of nanoparticles, where, in a first step a), at least two miniemulsions and/or minisuspoemulsions are produced, which in each case comprise at least one reactant in the disperse phase and at least one emulsifier, and, in a second step b), the miniemulsions and/or minisuspoemulsions produced in this way are preferably mixed in a high-pressure homogenizer.

Preferably, the production of the miniemulsions and/or minisuspoemulsions in step a) takes place in a high-pressure homogenizer under an emulsifying pressure in the range from 200 to 1000 bar, particularly preferably in the range from 200 to 800 bar, further preferably in the range from 400 to 800 bar. However, it is also possible to use miniemulsions which have been produced by another known process (for example by ultrasound treatment).

In one preferred embodiment of the invention, the mixing of the miniemulsions and/or minisuspoemulsions in step b) takes place in a high-pressure homogenizer. In particular, the mixing in step b) takes place in a high-pressure homogenizer under an emulsifying pressure in the range from 100 to 1000 bar, preferably in the range from 400 to 1000 bar, particularly preferably in the range from 800 to 1000 bar.

According to the process of the invention, the production of nanoparticles takes place in particular by coalescing, in a targeted manner, the drops of two miniemulsions/minisuspoemulsions with different disperse phases in which the reactants are present separately from one another, where the reactants are mixed and reacted. According to the present invention, the drop coalescence can be controlled in a targeted manner using process technology (e.g. through the configuration and combination of the nozzles or of the nozzle geometry) by making use of the phenomenon of short instability of the emulsion drops and resulting drop coalescence after the homogenizing nozzle.

The process steps of the 2-emulsion method for producing the particles firstly involve the separate production of two miniemulsions and/or minisuspoemulsions (step a)), these starting miniemulsions/minisuspoemulsions preferably differing in their disperse phases from a material point of view. The targeted coalescence of the miniemulsion drops (or minisuspoemulsion drops) is effected in the second step (emulsifying step (step b)).

As a result of the reaction of the reactants in the coalesced drops, a solid is formed, in particular in the form of nanoparticles or in the form of structures on nanoparticles already present (e.g. with formation of a shell structure).

To convert the minisuspoemulsion obtained in this way into a nanosuspension, it is possible, in an optional step c), to remove a fraction at least of one of the phases of the emulsion, preferably the disperse phase is removed, if appropriate also part of the continuous phase is removed here. This optional process step c) preferably takes place by evaporation, e.g. by distillation.

The coalescence of the drops by high-pressure homogenization (step b) can be controlled in particular by varying the emulsifying pressure, the geometry of the nozzle(s), the disperse phase fraction, the reactant concentrations, the temperature and the drop size distribution of the starting miniemulsions or starting minisuspoemulsions.

The described miniemulsions or minisuspoemulsions may be O/W or W/O emulsions. Preference is given to using W/O emulsions (inverse emulsions). The continuous phases and the disperse phase of both the starting miniemulsions/minisuspoemulsions used preferably comprise the same liquid as main constituent, although they may also comprise different liquids which are homogeneously miscible with one another.

The miniemulsions and/or minisuspoemulsions are preferably W/O emulsions comprising an aqueous disperse phase. In particular, the miniemulsions and/or minisuspoemulsions are W/O emulsions comprising an aqueous disperse phase in which, in each case, at least one reactant is dissolved. Preference is given to using nonpolar, organic solvents or mixtures thereof as continuous phase, in particular the continuous phase is formed by alkanes.

In particular, in the present invention, W/O or O/W emulsions are used comprising an aqueous phase and a phase comprising one or more organic solvents or monomers, where these liquids are selected from the group consisting of $C_5$-$C_{50}$-alkanes, vegetable and animal oils, silicone oils, paraffin, triglycerides, monomers (for example styrene, acrylates).

In one preferred embodiment of the described process, the fraction of the disperse phase in the miniemulsions and/or minisuspoemulsions produced in step a) is in the range from 1 to 70% by weight, in particular 5 to 50% by weight, preferably in the range from 20 to 40% by weight, based on the total amount.

In one embodiment of the invention, the disperse phase and/or the continuous phase comprise at least one emulsifier, where the emulsifier is preferably initially introduced in the continuous phase.

Depending on the system used, it is possible to use known anionic, cationic or nonionic emulsifiers for O/W and W/O emulsions. Emulsifiers for W/O emulsions in most cases have an HLB value of 3-8, emulsifiers for O/W emulsions in most cases have an HLB value of 8 to 18. The HLB value (from hydrophilic-lipophilic balance) is a dimensionless number between 0 and 20 which provides information about the solubility in water and oil of a compound and plays an important role in selecting emulsifiers or emulsifier mixtures.

Preferably, at least one emulsifier for W/O emulsions is added which can be selected from:
  sorbitan fatty acid esters, e.g. SPAN® emulsifiers,
  lecithins and cholesterols,
  polysorbates, e.g. TWEEN® emulsifiers,
  fatty acid esters of glycerol or polyglycerol esters, e.g. Mazol® emulsifiers
  fatty acid esters of ethylene glycol or polyethylene glycol
  amine alkoxylates, e.g. Quadrol® (BASF, DE),
  copolymers and block copolymers, e.g. polyoxamers (block copolymers of ethylene oxide and propylene oxide, Pluronic®); polyoxamines (block copolymers of ethylene oxide and propylene oxide with ethylenediamine block);
  polyisobutene-polyamine polymers (Glisopal®, BASF, DE), In one preferred embodiment, in steps a) and/or b), at least one W/O emulsifier is added to the continuous phases, said emulsifier being selected from the group consisting of Glisopal® (BASF, DE), Quadrol® (BASF, DE), Pluronic® (BASF, DE), SPAN® emulsifiers, TWEEN® emulsifiers, Mazol® emulsifiers and lecithin.

If O/W miniemulsions and/or minisuspoemulsions are used, one or more known O/W emulsifiers can be used. Of suitability here are customary nonionic, anionic, cationic and ampholytic emulsifiers.

The concentration of the emulsifier in the miniemulsions or minisuspoemulsions used is in the range from 0.1 to 10% by weight (based on the total emulsion), preferably in the range from 1 to 5% by weight, particularly preferably in the range from 1 to 3% by weight.

In particular, the mixing of the miniemulsions and/or minisuspoemulsions in step b) takes place in a high-pressure homogenizer through a homogenizing nozzle with a diameter (diameter of bore) in the range from 50 to 700 µm, preferably 70 to 400 µm. The preparation of the miniemulsions and/or minisuspoemulsions in step a) can likewise take place in the above-described high-pressure homogenizer or in one of the embodiments described below.

Preference is given to using at least one homogenizing nozzle/homogenizing device selected from the groups consisting of slot nozzle, perforated plate, gap diaphragm, diverting nozzle and countercurrent disperser in homogenization steps a) and/or b).

Figure 2A:
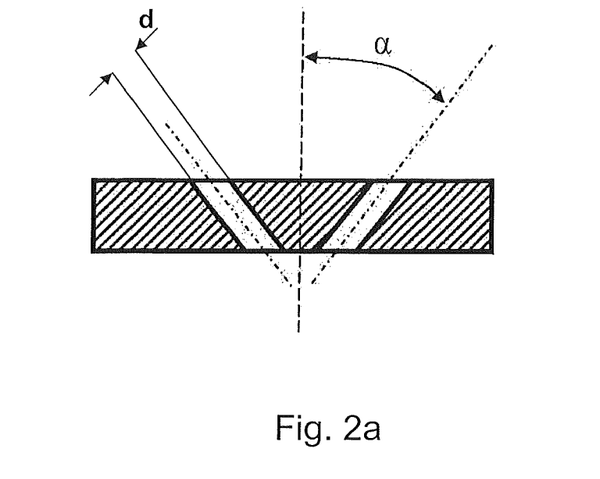
In FIG. 2a the schematical build-up of a two-stream nozzle with the angle α and the diameter of bore d is shown.

Particular preference is given to using at least one homogenizing nozzle/homogenizing device selected from the group consisting of perforated plate, gap diaphragm and diverting nozzle in the homogenization steps a) and b). In FIG. 2a a perforated plate with the diameter (diameter of bore) d is shown schematically.

Figure 2B:
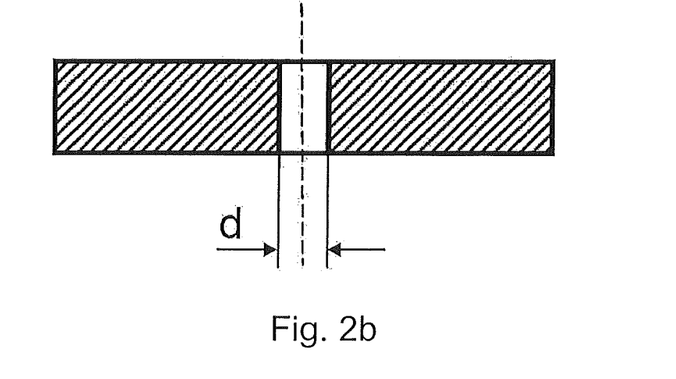
In FIG. 2b the schematical build-up of a perforated plate with the diameter (diameter of bore) d is shown.

In a preferred embodiment of the invention at least one two-stream nozzle is used in the homogenizing steps a) and/or b). A two-stream nozzle encompasses in particular a perforated plate with two bore diameters, which are placed in a defined angle α at the perforated plate surface (see FIG. 2). The fluid passes through the nozzle and is separated into two streams, which are crossed on each other behind the nozzle. In particular, a two-stream nozzle with a diameter (diameter of bore) d in the range of 50 to 700 μm, preferably of 50 to 100 μm, and with an angle α in the range of 10° to 60°, preferably of 20° to 30°, is used. FIG. 2 shows an embodiment of a suitable two-stream nozzle.

In one embodiment of the process according to the invention, the mixing of the miniemulsions and/or minisuspoemulsions in step b) takes place in a high-pressure homogenizer, where at least one two-stream nozzle with a diameter (diameter of bore) d in the range of 50 to 700 μm and with an angle α in the range of 10° to 60° is used as homogenizing nozzle.

In one embodiment of the process according to the invention, the mixing of the miniemulsions and/or minisuspoemulsions in step b) takes place in a high-pressure homogenizer, where at least one perforated plate is used as homogenizing nozzle with a diameter (diameter of bore) in the range from 50 to 700 μm, preferably 70 to 400 μm. Preferably, the mixing of the miniemulsions and/or minisuspoemulsions in step b) takes place in a high-pressure homogenizer, where two perforated plates arranged one behind the other are used as homogenizing nozzle with in each case a diameter in the range from 50 to 700 μm.

In one preferred embodiment of the invention, one or more (preferably two) perforated plates with a diameter (diameter of bore) in the range from 50 to 700 μm, preferably 70 to 400 μm, are used in homogenizing steps a) and/or b). Particular preference is given to a process in which the mixing of the miniemulsions and/or minisuspoemulsions in step b) takes place in a high-pressure homogenizer, where two perforated plates arranged one behind the other are used as homogenizing nozzle with in each case a diameter in the range from 50 to 700 μm, preferably 70 to 400 μm.

In a further embodiment of the invention, two perforated plates with diameters of 100 μm and 200 μm are used. In a further embodiment, two perforated plates with diameters of 200 μm and 400 μm are used.

The size distribution of the droplets of an emulsion or suspoemulsion can be determined by customary methods, for example by means of laser diffraction or dynamic light scattering.

One characteristic of the droplet size distribution is the Sauter diameter. If the total volume of the emulsion droplets were to be re-formed into equally sized spheres, where the total surface of the droplets remains the same, then these droplets would have the Sauter diameter ($x_{1,2}$) as diameter. It is defined by the following formula:

$$x_{1,2}=6/S_V$$

where the specific surface area $S_V=S_{tot}/V_{tot}$, where $S_{tot}$ is the total surface area of the particles and $V_{tot}$ is the total volume of the particles.

Within the context of the present invention, reactant is the term used to refer to a starting material for a chemical reaction or physical conversion which, within the context of the invention, under the stated conditions, leads to the formation or deposition of a solid. Within the context of the present invention, a precursor substance (precursor), which already has a similar structure to the product can also be referred to as reactant. Also possible is the reaction of a reactant mixture, which is present in one of the disperse phases, through mixing (with coalescence of the emulsion droplets) with a second disperse phase which comprises a suitable catalyst. Consequently, within the context of the present invention, reactant can also be understood as meaning a catalyst or another substance involved in a chemical reaction or physical conversion (for example an antisolvent).

Within the context of the present invention, reaction is also understood as meaning the precipitation of a dissolved precursor substance by mixing with an antisolvent or by changing the pH.

Preferably, the reactants are present in dissolved form, in particular dissolved in molecularly disperse or colloidal form, in the disperse phase of a miniemulsion. In a further embodiment of the invention, it also possible to use solid reactants, for example in the form of nanoparticles in the form of a minisuspoemulsion, in the present process according to the invention. During the reaction of the reactants, at least one solid product is necessarily formed. The reactants can be reacted with one another in particular in a precipitation reaction, in a redox reaction, in an acid/base reaction or a polymerization.

In one embodiment of the invention, the described process for the production of nanoparticles is one in which the miniemulsions or minisuspoemulsions are W/O emulsions which comprise an aqueous disperse phase in which, in each case, at least one reactant is dissolved, in particular is dissolved in molecularly disperse form.

In one embodiment, the invention relates to a process for the production of nanoparticles wherein the reactants present in the disperse phases of the miniemulsions and/or minisuspoemulsions are salts dissolved in molecularly disperse form, which are present in a molar concentration in the range from 0.01 to 0.5 mol/l, and which, upon mixing the miniemulsions and/or minisuspoemulsions in step b), react with precipitation of a solid.

Furthermore, at least one reactant present in the disperse phases of the miniemulsions and/or minisuspoemulsions is an acid or a base. Preferably the reactant is a acid or a base, preferably in a concentration in the range from 0.01 to 0.5 mol/l.

In particular, the reactants are a water-soluble salt comprising cations selected from the group of alkali metal, alkaline earth metal, noble metal (gold (Au), silver (Ag), ruthenium (Ru), rhodium (Rh), palladium (Pd), osmium (Os), iridium (Ir), platinum (Pt)), silicon (Si), tin (Sn), iron (Fe), nickel (Ni), cobalt (Co), zinc (Zn), titanium (Ti), zirconium (Zr), yttrium (Y) and cerium (Ce), particular preference being given to salts of alkali metal, alkaline earth metal and noble metal, and further preference being given to salts of alkali metals.

Preferably nanoparticles can be produced with the help of the inventive process selected from the group consisting of method barium sulfate nanoparticles, zinc oxide nanoparticles, titanium dioxide nanoparticles, tin oxide nanoparticles, and silicon dioxide nanoparticles.

In one embodiment of the invention in the first step a) of the process described above a miniemulsion is produced comprising as disperse phase an aqueous solution of an water-soluble barium salt (e.g. barium chloride) and a miniemulsion comprising as disperse phase an aqueous solution of an water-soluble sulphate salt (e.g. potassium sulfate), and in the second step the miniemulsions were mixed in a high-pressure homogenizer by producing of barium sulfate nanoparticles.

In one further embodiment of the invention in the first step a) of the process described above a miniemulsion is produced comprising as disperse phase an aqueous solution of an water-soluble zinc salt (e.g. zinc sulfate) and a miniemulsion comprising as disperse phase an aqueous solution of a base (e.g. caustic soda solution), and in the second step the miniemulsions were mixed in a high-pressure homogenizer by producing of zinc oxide nanoparticles.

Here, water-soluble is to be understood as meaning a salt which has a solubility in water of $\geq 10$ g/l.

The process according to the invention can be operated discontinuously, by, for example, carrying out steps a) and b) at different times in the same high-pressure homogenizer. However, it is also possible to operate the process for the production of nanoparticles continuously by combining two or more high-pressure homogenizers.

The miniemulsions and/or minisuspoemulsions obtained in step a) can optionally be mixed in an interim step initially with low shear, for example using a propeller stirrer, and then be coalesced in a targeted manner in a high-pressure homogenizer. However, it is also possible to bring together the miniemulsions and/or minisuspoemulsions directly in the high-pressure homogenizer.

The temperature when carrying out the process steps is in the range from 0° C. to 200° C., preferably in the range from 10° C. to 100° C. In one preferred embodiment of the invention, the temperature is in the range from 20° C. to 30° C.

Moreover, the present invention also relates to nanoparticles which can be produced (are obtainable) or have been produced by the process described above. The present invention likewise relates to nanostructured particles which have been produced by the process described above, i.e. to particles which have a structure in the nanometer range (for example core/shell particles or nanoscale regions on the particle surface).

The present invention relates to nanoparticles where these can be produced (are obtainable) or are produced by a process in which, in a first step a), two miniemulsions and/or minisuspoemulsions are produced, which, in each case, comprise at least one reactant in the disperse phase and at least one emulsifier, and, in a second step b), the miniemulsions and/or minisuspoemulsions produced in this way are mixed in a high-pressure homogenizer.

The present invention preferably relates to nanoparticles with an average particle diameter in the range from 1 to 1000 nm, preferably in the range from 10 to 500 nm, very particularly preferably in the range from 10 to 200 nm. The nanoparticles obtainable by the process according to the invention can have a high uniformity, in particular in terms of the particle size.

The nanoparticles can be used in the form of the directly forming minisuspoemulsion or in the form of a nanosuspension, which is partly or almost completely obtainable by removing at least one phase of the emulsion phases. Preferably, the disperse phase is partly removed, the disperse phase is almost completely removed or the disperse phase is removed together with a fraction of the continuous phase. Furthermore, the nanoparticles can also be used in solid form, as can be obtained by suitable methods, for example drying, spray-drying.

The particles produced with the help of the described process can be used, for example, as catalysts, where the catalyst may be present in defined regions of the nanoparticle surface. The particles may also serve as particulate starting material for organic photovoltaics (OPV) or as controlled release systems for pharmaceutical applications and crop protection.

Figure 1:
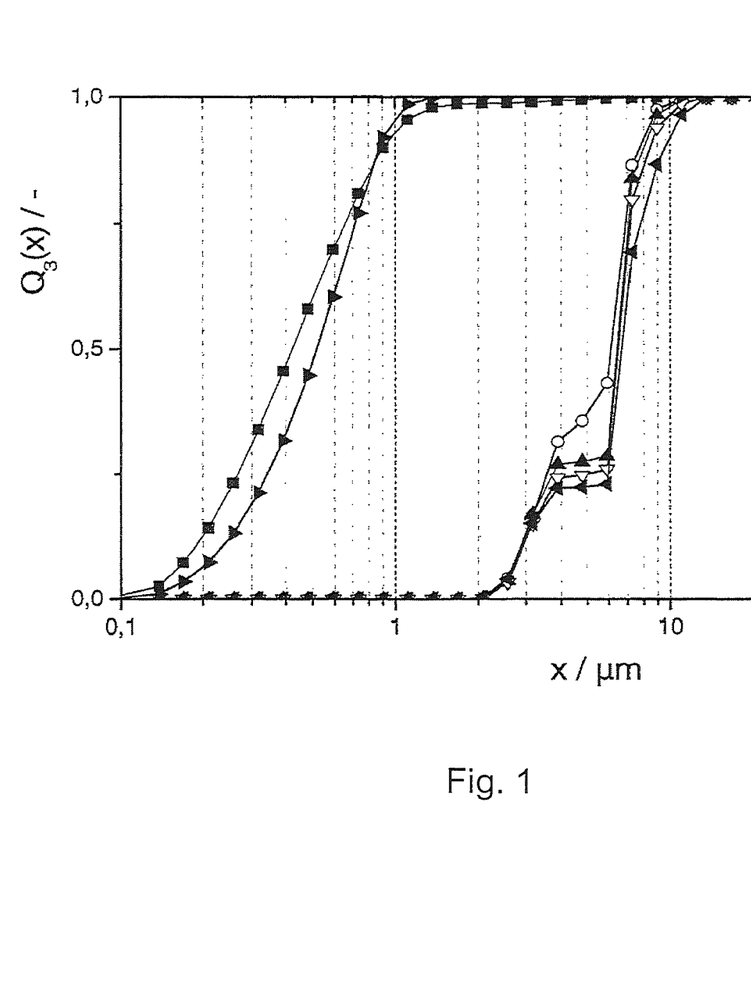
FIG. 1 shows the cumulative distribution $Q_3(x)$ of droplets size x (in μm) before and after the homogenization (step b) for the miniemulsions produced according to Example 3 (mit ▶=after the first emulsifying step; ■=after the second emulsifying step at Δp=200 bar, σ=after the second emulsifying step at Δp=400 bar; ▲=after the second emulsifying step at Δp=600 bar; ▽=after the second emulsifying step at Δp=800 bar; ◀=after the second emulsifying step at Δp=1000 bar).

It follows a brief description of the drawings:

FIG. 1 shows the cumulative distribution $Q_3(x)$ of droplets size x (in μm) before and after the homogenization (step b) for the miniemulsions produced according to Example 3 (mit ▶=after the first emulsifying step; ■=after the second emulsifying step at $\Delta p=200$ bar, o=after the second emulsifying step at $\Delta p=400$ bar; ▲=after the second emulsifying step at $\Delta p=600$ bar; ∇=after the second emulsifying step at $\Delta p=800$ bar; ◀=after the second emulsifying step at $\Delta p=1000$ bar).

In FIG. 2a the schematical build-up of a two-stream nozzle with the angle α and the diameter of bore d is shown. In FIG. 2b the schematical build-up of a perforated plate with the diameter (diameter of bore) d is shown.

Figure 3:
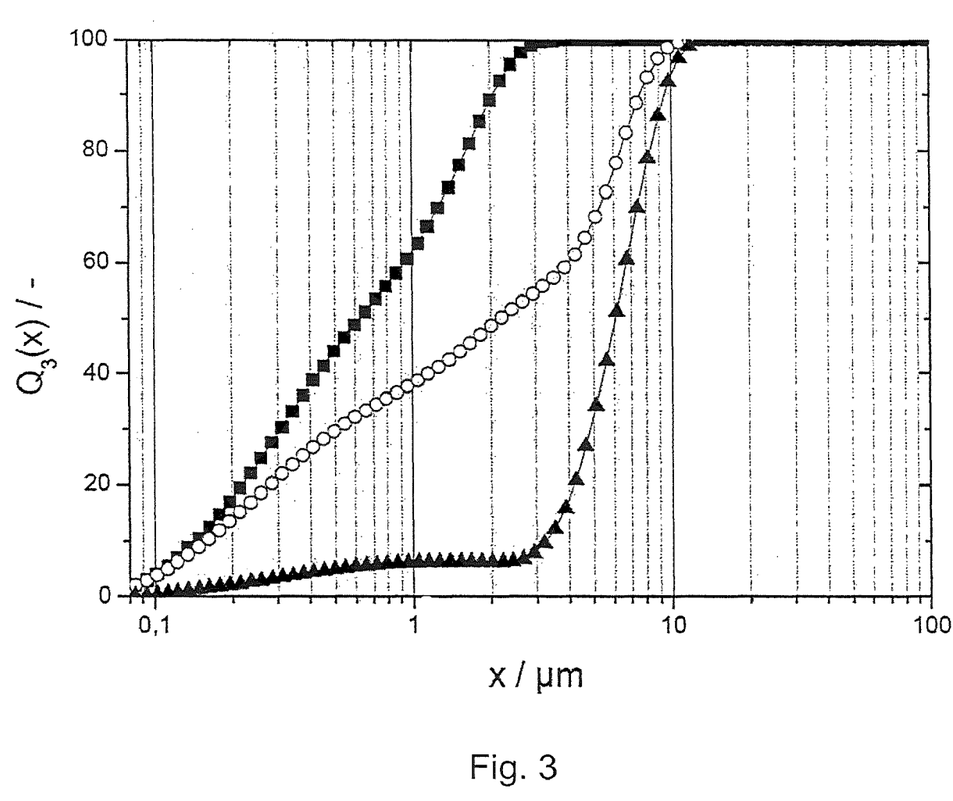
FIG. 3 shows the cumulative distribution $Q_3(x)$ of droplets size x in μm after the first and second emulsifying steps for the miniemulsions produced according to Example 7 (with ■=after the first emulsifying step; σ=after the second emulsifying step at Δp=400 bar; ▲=after the second emulsifying step at Δp=1000 bar).

FIG. 3 shows the cumulative distribution $Q_3(x)$ of droplets size x in μm after the first and second emulsifying steps for the miniemulsions produced according to Example 7 (with ■=after the first emulsifying step; o=after the second emulsifying step at $\Delta p=400$ bar; ▲=after the second emulsifying step at $\Delta p=1000$ bar).

Figure 4:
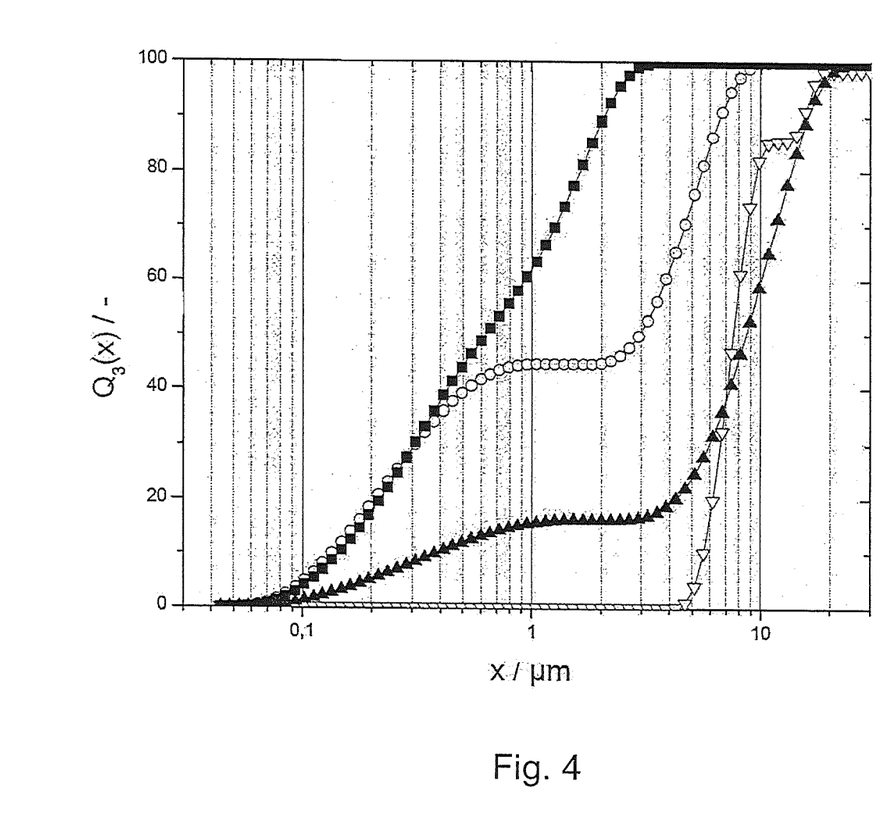
FIG. 4 shows the cumulative volume distribution $Q_3(x)$ of the droplets size x in μm after the first and second emulsifying step for the miniemulsions produced according to Example 8 (with ■=after the first emulsifying step, σ=after the second emulsifying step at Δp=1000 bar, standard perforated plate with d=0.1 mm; ▲=after the second emulsifying step at Δp=1000 bar, standard perforated plate with d=0.2 mm; ▽=after the second emulsifying at Δp=1000 bar, two-stream nozzle as described in Example 8).

FIG. 4 shows the cumulative volume distribution $Q_3(x)$ of the droplets size x in μm after the first and second emulsifying step for the miniemulsions produced according to Example 8 (with ■=after the first emulsifying step, o=after the second emulsifying step at $\Delta p=1000$ bar, standard perforated plate with d=0.1 mm; ▲=after the second emulsifying step at $\Delta p=1000$ bar, standard perforated plate with d=0.2 mm; ∇=after the second emulsifying at $\Delta p=1000$ bar, two-stream nozzle as described in Example 8).

The present invention is illustrated in more detail by the examples below.

EXAMPLES

Example 1

Production of the Starting Miniemulsions in Emulsifying Step a)

Barium chloride ($BaCl_2$, Merck, Darmstadt) and potassium sulfate ($K_2SO_4$, Merck, Darmstadt) were used as acquired and not subjected to any further purification. Barium chloride and potassium sulfate were dissolved in deionized water in the molar concentration given in each case. In all of the experiments, the molar ratio b of the reactants according to equation (1) was about 5, the reactant barium sulfate was thus always initially introduced in a 5-fold excess compared to potassium sulfate.

$$b = \frac{c_{Ba^{2+}}}{c_{SO_4^-}} \tag{1}$$

As emulsifier, the nonionic emulsifier Glissopal® EM-23 (BASF SE, Ludwigshafen) was added to the continuous phase. The emulsifier concentration was 3% by weight.

The aqueous solutions of $BaCl_2$ and $K_2SO_4$ were in each case mixed with n-decane. Prior to the actual high-pressure homogenization step, the mixtures obtained in this way were stirred for 2 minutes using a propeller stirrer (diameter about 6 cm) at 400 min$^{-1}$. The mixtures were then homogenized separately in a high-pressure homogenizer (M–110Y Microfluidizer® from Microfluidics). The "microfluidizer nozzle" from Microfluidics was used.

The two miniemulsions obtained as described above were then mixed and stirred for two minutes (propeller stirrer, 400 min$^{-1}$). The miniemulsion obtained in this way was used for producing nanosuspoemulsions in Examples 3 to 6.

Example 2

Production of the Starting Miniemulsions in Step a)—Influence of the Emulsifying Pressure The miniemulsions were produced as described in Example 1. Here, the barium chloride concentration c(BaCl$_2$)= 0.10 mol/l and the potassium sulfate concentration c(K$_2$SO$_4$)=0.02 mol/l. The emulsifier concentration for both emulsions was 3% by weight, the disperse phase fraction 40% by weight. The reproducibility of the results was confirmed by several repetitions of the experiments.

The mixtures obtained were in each case homogenized at an emulsifying pressure of 400 and 800 bar as described in Example 1. Average drop sizes in the range from 0.5 to 1 µm were obtained. It was found that an emulsifying pressure of Δp=800 bar was particularly suitable for obtaining a stable miniemulsion comprising barium chloride in the aqueous disperse phase. For the potassium sulfate solution as disperse phase (c(K$_2$SO$_4$)=0.02 mol/l), a homogenizing pressure of just Δp=400 bar led to a stable miniemulsion. The Sauter diameters $x_{1,2}$ amount here to ca. 365 nm in the case of the emulsion with barium chloride solution and ca. 475 nm with potassium sulfate as disperse phase.

For the examples below, unless stated otherwise, the premix with barium chloride solution was homogenized at Δp=800 bar, but with potassium sulfate solution as disperse phase at Δp=400 bar on the M-110 Y Microfluidizer®.

Example 3

Production of Barium Sulfate Nanoparticles (Step b)

Two emulsions with aqueous disperse phases containing barium chloride and potassium sulfate were produced as described in Examples 1 and 2 and homogenized separately. The two emulsions were mixed and stirred for two minutes using propeller stirrers (400 min$^{-1}$). The crude emulsion was then emulsified on the M-110 Y Microfluidizer®. In this high-pressure emulsifying step, the pressure stages 200, 400, 600, 800 and 1000 bar were passed through.

The results of the drop size distribution before and after the emulsifying step show that the emulsifying pressure has a decisive influence on the coalescence rate depending on the emulsion system. For example, the drop size distribution of the emulsion does not change within the scope of measurement accuracy after the second emulsifying step at a pressure less than 400 bar compared to the emulsion after the first emulsifying step. However, an emulsifying pressure above 400 bar results noticeably in coalescence and thus in drop enlargement. For the present working example, a minimum pressure of Δp=400 bar is necessary for producing coalescence of the starting miniemulsion droplets in the high-pressure homogenization step. Whereas the Sauter diameter $x_{1,2}$ after emulsifying step a) was still ca. 400 nm, the average drop size in the case of an emulsifying pressure of 400 bar or higher is about 7 µm. In order to achieve such a drop enlargement, coalescence of ca. 1500 emulsion drops is required.

The compositions of the resulting miniemulsions or minisuspoemulsions were analyzed by means of elemental analysis. Thus, for example, it was possible to exclude the possibility that, at pressures less than 400 bar, the drops coalesce and are then reduced in size again since the elemental analysis was able to confirm only the presence of barium chloride, but not that of the precipitation product barium sulfate.

FIG. 1 shows the cumulative distribution of the droplet sizes x (in µm) before and after the homogenization (step b) and as a function of the emulsifying pressure. The value $Q_3(x)$ indicates the cumulative distribution, i.e. the fraction of droplets of the corresponding size.

The triangles with apex right (▶) shows the cumulative volume distribution $Q_3(x)$ of the droplets after the first emulsifying step; the dark squares (■) shows the cumulative volume distribution $Q_3(x)$ of the droplets after the second emulsifying step (step b) at Δp=200 bar, the bright circles (o) show the cumulative volume distribution $Q_3(x)$ of the droplets after the second emulsifying step (step b) at Δp=400 bar; the dark triangles with apex up (▲) show the cumulative volume distribution $Q_3(x)$ of the droplets after the second emulsifying step (step b) at Δp=600 bar; the bright triangles with apex down (▽) show the cumulative volume distribution $Q_3(x)$ of the droplets after the second emulsifying step (step b) at Δp=800 bar; the triangles with apex left (◀) shows the cumulative volume distribution $Q_3(x)$ of the droplets after the second emulsifying step (step b) at Δp=1000 bar.

Example 4

Influence of the Disperse Phase Fraction on the Forced Coalescence in Step b)

Emulsions were produced as described in Example 1 at pressures of Δp=800 bar (barium chloride solution) or Δp=400 bar (potassium sulfate solution) and then the mixture of the two emulsions was homogenized again in the second emulsifying step at Δp=600 bar using the M-110 Y Microfluidizer® as described in Example 3. The fraction of the disperse phase of the emulsions was varied between 20, 30 and 40% by weight, with the mass fractions of the remaining components always being kept constant.

The results relating to the drop size distributions obtained show that the disperse phase fraction has a significant influence on the coalescence rate. It was clear that as the disperse phase fraction decreases, the coalescence rate is also reduced or completely suppressed. For a disperse phase fraction of 20% by weight, the Sauter diameter $x_{1,2}$ changes only slightly after the second emulsifying step (from ca. 290 nm to ca. 320 nm). As the disperse phase fraction increases, the Sauter diameter $x_{1,2}$ of the emulsion drastically increases after the 2nd emulsifying step (step b)) and a drop size of ca. 1100 nm for 30% by weight disperse phase fraction and 4550 nm for 40% by weight disperse phase fraction results.

The assumption of the constant drop size distribution as a result of coalescence with a subsequent reduction in the size of the drops was refuted by EDX analyses.

Example 5

Influence of the Salt Concentration on the Forced Coalescence in Step b

The procedure was as described in Examples 1 and 2 although, differently from Examples 1 and 2, the barium chloride concentrations were in each case adjusted to the following values: c(V1)=0.05 mol/l; c(V2)=0.25 mol/l or c(V3)=0.50 mol/l. The molar ratio b was 5, as also in Examples 3 to 4, which produced corresponding calcium sulfate concentrations of c(V1)=0.01; c(V2)=0.05 and c(V3)= 0.10 mol/l. The emulsion containing barium chloride solution was prepared as in Example 1 at Δp=800 bar, the emulsion containing potassium sulfate solution at Δp=400 bar using the M-110Y Microfluidizer®.

Then, the mixture of the corresponding emulsions (V1, V2, V3) was formed as in Example 3, and this was stirred for 2 minutes using a propeller stirrer (400 min$^{-1}$) and then homogenized on the M-110 Y Microfluidizer® at Δp=600 bar. The drop size distributions of the emulsions after the second emulsifying step were analyzed. The results showed that an increase in the salt concentration has a stabilizing effect on the emulsion. The Sauter diameter of emulsions whose disperse phase had a barium chloride concentration>0.25 mol/l is in the range of the value of an emulsion after the first emulsifying step ($x_{1,2} \approx 400$ nm). For lower salt concentrations (e.g. 0.05 mol/l $BaCl_2$), however, Sauter diameters up to ca. 5 μm resulted. Further experiments have shown that even at a salt concentration of 0.12 mol/l of barium chloride and a correspondingly smaller amount of potassium sulfate (b=5), coalescence of the drops can be produced after the second emulsifying step.

In this case too, the assumption of the constant drop size distribution as a result of coalescence with a subsequent reduction in the size of drops was refuted by elemental analyses (EDX analyses).

Example 6

Influence of the Salt Concentration on the Particle Size in Step b)

The influence of the initially introduced salt concentration on the particle size of the precipitated barium sulfate was investigated. Emulsions with differing disperse phases (barium chloride solution and potassium sulfate solution) were prepared and homogenized as described in Example 1, where the barium chloride concentrations of c(V1)=0.04 mol/l; c(V2)=0.08 mol/l and c(V3)=0.12 mol/l and the potassium sulfate concentration corresponding to a molar ratio b of 5 were established. The mixture of the two corresponding emulsions was then emulsified in the second emulsifying step at $\Delta p$=600 bar as described in Example 2 using the M-110Y Microfluidizer®. The particle size distributions of the suspensions were analyzed following azeotropic distillation (40° C., 25 mbar). It was found that the initially introduced reactant concentration has a slight influence on the particle size. For the concentrations analyzed, average particle diameters ($x_{1,2}$ values) between 10 nm and 13 nm always resulted.

Example 7

Production of Zinc Oxide Nanoparticles

Starting miniemulsions were prepared according to Example 1 and 2, using either a 0.1 M solution of zinc sulfate in deionized water as aqueous phase or 0.1 M sodium hydroxide solution. The high-pressure homogenisation was carried out using a two-stream nozzle with a diameter (diameter of bore) of d=0.08 mm and with an angle α of α=30°. The emulsifying pressure in the first emulsifying step was $\Delta p$=600 bar.

The obtained starting miniemulsions were mixed as described in Example 1 and 2.

Starting from the mixture of the miniemulsions as described above minisuspoemulsions of zinc oxide nanoparticles were produced as described in Example 3. Here the above described two-stream nozzle was used. The high pressure homogenisation was carried out with emulsifying pressures of $\Delta p$=400 bar and $\Delta p$=1000 bar.

FIG. 3 shows the droplets size x in μm after the first and second emulsifying steps. The value $Q_3(x)$ indicates the cumulative distribution of the droplets (traction of droplets of the corresponding size).

The dark squares (■) show the cumulative distribution of the droplets after the first emulsifying step; the bright circles (o) show the cumulative distribution of the droplets after the second emulsifying step at $\Delta p$=400 bar; the dark triangles (▲) show the cumulative distribution of the droplets after the second emulsifying step at $\Delta p$=1000 bar.

At an emulsifying pressure of 1000 bar droplets of an average drop size (Sauter diameter) of about 6 μm can be obtained.

Example 8

Comparison of Different Homogenisation Nozzles

Starting miniemulsions of barium chloride solution (c=0.1 mol/l) and of potassium sulfate (c=0.02 mol/l) as described in Example 2 were prepared. The emulsifying pressure in the first emulsifying step (step a)) was $\Delta p$=600 bar.

Starting from the starting miniemulsions, barium sulfate nanoparticles were prepared as described in Example. 3. The emulsifying pressure at the second emulsifying step (step b)) was $\Delta p$=1000 bar. Here the following homogenisation nozzles were used: standard perforated plate with a diameter (diameter of bore) of d=0.1 mm, standard perforated plate with a diameter (diameter of bore) of d=0.2 mm, two stream nozzle with a diameter (diameter of bore) of d=0.08 mm and an angle α of α=30°.

FIG. 4 shows the cumulative volume distribution $Q_3(x)$ of the droplets size x in μm. The dark squares (■) show the cumulative volume distribution of the droplets after the first emulsifying step, the circles (o) show the cumulative volume distribution of the droplets after the second emulsifying step at $\Delta p$=1000 bar using the standard perforated plate with d=0.1 mm; the dark triangles with apex up (▲) show the cumulative volume distribution of the droplets using the standard perforated plate with d=0.2 mm; the bright triangles with apex down (▽) show the cumulative volume distribution of the droplets using the above described two-stream nozzle.

It was found that the coaleszence of the droplets of the starting miniemulsions can be increased by using a two-stream nozzle.

The invention claimed is:

1. A process for the production of nanoparticles which comprises producing in a first step a), at least two miniemulsions and/or minisuspoemulsions, which in each case comprise at least one reactant in the disperse phase and at least one emulsifier, and, in a second step b), the miniemulsions and/or minisuspoemulsions produced in this way are mixed in a high-pressure homogenizer under an emulsifying pressure in the range from 100 to 1000 bar, wherein the disperse phase of the at least two miniemulsions and/or minisuspoemulsions have an average droplet diameter of <10 μM, wherein in step b) a targeted coalescence of the miniemulsion droplets or minisuspoemulsion droplets is effected.

2. The process for the production of nanoparticles according to claim 1, wherein the production of the miniemulsions and/or minisuspoemulsions in step a) takes place in a high-pressure homogenizer under an emulsifying pressure in the range from 200 to 1000 bar.

3. The process for the production of nanoparticles according to claim 1, wherein the mixing of the miniemulsions and/or minisuspoemulsions in step b) takes place in a high-pressure homogenizer, where at least one perforated plate is used as homogenizing nozzle with a diameter in the range from 50 to 700 μm.

4. The process for the production of nanoparticles according to claim 1, wherein the mixing of the miniemulsions and/or minisuspoemulsions in step b) takes place in a high-pressure homogenizer, where two perforated plates arranged one behind the other are used as homogenizing nozzle with in each case a diameter in the range from 50 to 700 μm.

5. The process for the production of nanoparticles according to claim 1, wherein the mixing of the miniemulsions and/or minisuspoemulsions in step b) takes place in a high-pressure homogenizer, where at least one two-stream nozzle is used as homogenizing nozzle with a diameter in the range from 50 to 700 μm and an angle α in the range of 10° to 60° C.

6. The process for the production of nanoparticles according to claim 1, wherein the fraction of the disperse phase in the miniemulsions and/or minisuspoemulsions produced in step a) is in the range from 5 to 50% by weight, based on the total amount.

7. The process for the production of nanoparticles according according to claim 1, wherein the miniemulsions and/or minisuspoemulsions are W/O emulsions comprising an aqueous disperse phase.

8. The process for the production of nanoparticles according to claim 1, wherein the miniemulsions and/or minisuspoemulsions are W/O emulsions comprising an aqueous disperse phase in which, in each case, at least one reactant is dissolved.

9. The process for the production of nanoparticles according to claim 1, wherein the reactants present in the disperse phases of the miniemulsions and/or minisuspoemulsions are salts dissolved in molecularly disperse form, which are present in a molar concentration in the range from 0.01 to 0.5 mol/l, and which, upon mixing the miniemulsions and/or minisuspoemulsions in step b), react with precipitation of a solid.

10. The process for the production of nanoparticles according to claim 1, wherein the reactants are a water-soluble salt comprising cations selected from the group consisting of alkali metal, alkaline earth metal, noble metal, silicon, tin, iron, nickel, cobalt, zinc, titanium, zirconium, yttrium and cerium.

11. The process for the production of nanoparticles according to claim 1, wherein the nanoparticles are uniform.

12. The process for the production of nanoparticles according to claim 11, wherein the nanoparticles have an average diameter from 1 to 1000 nm.

13. The process for the production of nanoparticles according to claim 11, wherein the nanoparticles have an average diameter from 10 to 200 nm.

14. The process for the production of nanoparticles according to claim 1, wherein the nanoparticles have an average diameter from 1 to 1000 nm.

15. The process for the production of nanoparticles according to claim 1, wherein the nanoparticles have an average diameter from 10 to 500 nm.

16. The process for the production of nanoparticles according to claim 1, wherein the nanoparticles have an average diameter from 10 to 200 nm.

* * * * *